3,085,105
ORTHOSILICATE THIAESTERS

Philip J. Garner, Hooton, and Vivian A. Moffatt, Bebington, England, assignors to Shell Oil Company, a corporation of Delaware
No Drawing. Filed Dec. 7, 1959, Ser. No. 857,513
Claims priority, application Great Britain Apr. 10, 1959
7 Claims. (Cl. 260—448.8)

This invention relates to improved ortho-silicate thiaesters and the corresponding disiloxanes. More particularly, it relates to thia-esters of ortho-silicic acid having improved hydrolytic stability and properties for use in or as lubricating compositions. Thia-alkyl ortho-silicates previously proposed have high viscosity indices, load bearing capacity and good low temperature properties. However, these thia-esters have found very limited use due to their ease of hydrolysis in the presence of water which may be encountered during lubricating processes and the like.

It is an object of he present invention to provide improved thia-alkyl ortho-silicates and disiloxanes. It is a further object of this invention to provide improved thia-alkyl ortho-silicates having excellent hydrolysis stability. It is a particular object of the invention to provide lubricating compositions containing improved thia-alkyl silicates. Other objects will become apparent during the detailed description of this invention.

Now, in accordance with the present invention, novel thia-alkyl ortho-silicates and disiloxanes are provided in which at least one of the carbon atoms directly attached to oxygen is a tertiary carbon atom. Still in accordance with this invention it has been found that such thia-alkyl silicates and disiloxanes retain all of their beneficial properties which are of value in lubricating compositions and at the same time have unexpectedly improved hydrolytic stability. Still in accordance with this invention, lubricating compositions are provided containing from 5 to 100% of the thia-alkyl silicates and/or disiloxanes as more particularly described hereinafter.

Accordingly, the present invention provides ortho-silicate esters of the general formula:

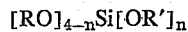

in which $n$ is 1, 2, 3 or 4, R' is a thia-alkyl group and R is an alkyl group and in which at least one of the carbon atoms attached to an oxygen atom is a tertiary carbon atom.

The esters of this invention are thus tetra-thia-alkyl ortho-silicates containing at least one tertiary carbon atom attached to oxygen or are mixed alkyl thia-alkyl ortho-silicates containing at least one tertiary carbon atom attached to oxygen. In the latter case, the tertiary carbon atom may be either in the alkyl group or in the thia-alkyl group. Preferably at least two of the carbon atoms attached to oxygen are tertiary carbon atoms. Preferably each of the thia-alkyl and alkyl groups in the ester contains 4 to 10 carbon atoms.

The method of preparation of the ortho-silicate esters of this invention depends on the number of tertiary carbon atoms attached to oxygen in the molecule. Thus, a thia-alkanol having a tertiary carbon atom attached to the oxygen atom may be reacted with silicon tetrahalide, particularly silicon tetrachloride, in the presence of a reagent capable of combining with the hydrogen halide as it is liberated. Depending on the mol ratio of the reactants, one, two or three thia-alkyloxy groups from such alkanols can be made to replace halogen atoms but not four. The remaining halogen atoms may then be replaced by secondary or primary alkyl or thia-alkyl groups by a similar reaction.

Suitable reagents capable of combining with hydrogen halide in the above reaction are dimethylaniline, pyridine, quinoline and the picolines particularly alpha-picoline. Generally, the reaction takes place at room temperature and cooling is necessary to maintain such a temperature. The reaction may be carried out in the presence of an inert reaction medium, such as a petroleum ether or naphtha, hexane, xylene or chlorobenzene.

Ortho-silicate esters of this invention containing four tertiary carbon atoms attached to oxygen require a two-stage synthesis. Firstly, a tri(tert-alkoxy)- or tri(tert-thia-alkoxy)-halosilane is made by the method outlined above or by reacting a silicon tetrahalide with an alkali metal derivative of the alcohol, and this halosilane is reacted with an alkali metal derivative of a tertiary thia-alkanol or tertiary alkanol, e.g. by heating at 200° to 250° C.

Thia-alkanols containing a tertiary carbon atom attached to the oxygen atom and suitable for use in making the esters of this invention may be made by reacting a halo-substituted tertiary alkanol with a sodio derivative of a mercaptan. Thus the sodio derivative of methyl, ethyl, propyl, butyl, amyl, hexyl, octyl, nonyl or dodecyl mercaptan may be reacted with a mono-halo-substituted tertiary butyl alcohol, tertiary amyl alcohol, dimethyl isopropyl carbinol or dimethyl tertiary butyl carbinol to give suitable thia-alkanols. Typical of such thia-alkanols are 1,1-dimethyl-3-thia-heptanol, 1,1-dimethyl-4-thia- octanol, 1,1-dimethyl-5-thia-nonanol, and 1,1,2-trimethyl-3-thiaheptanol.

The ortho-silicate esters of this invention may also be derived from two different thia-alkanols, one containing a tertiary carbon atom attached to the oxygen atom and the other being free from such a tertiary carbon atom. Typical of thia-alkanols of the latter type are 4-thia-octanol, 3-thia-octanol, 6-ethyl-3-thia-heptanol, 7-methyl-4-thia-octanol, 5-ethyl-4-thia-hexanol, 4-thia-hexanol, 4-thia-decanol and 7-thia-undecanol. The two types of thia-alkanols may be reacted with a silicon tetrahalide, either together or successively in either order.

The mixed alkyl thia-alkyl ortho-silicates of this invention may be made by reacting a mixture of the appropriate alkanol and thia-alkanol with a silicon tetrahalide or by reacting the alkanol and the thia-alkanol successively with a silicon tetrahalide. It is preferred to react the component containing the tertiary carbon atom attached to oxygen before reacting the component free from such a tertiary carbon atom. The tertiary carbon atom attached to oxygen may be provided by the alkanol or the thia-alkanol. Suitable alkanols for this purpose are tertiary butyl alcohol, tertiary amyl alcohol, dimethyl isopropyl carbinol and dimethyl tertiary butyl carbinol. These may be used with any of the thia-alkanols referred to above. In the case of a mixed alkyl thia-alkyl ortho-silicate, where the thia-alkyl group or groups contain(s) a tertiary carbon atom attached to oxygen, the alkyl groups may be derived from primary or secondary alkanols and preferably they are derived from branched chain primary alkanols, such as 2-ethyl hexanol or 3,5,5-trimethyl hexanol. However, other alkanols may be used, such as normal butanol, pentanol, hexanol, octanol, or dodecanol. Where mixtures of alkanols and thia-alkanols are used in forming the ortho-silicate esters of this invention, even where reaction takes place successively with the different types of alkanols, the products obtained are often mixtures of different ortho-silicate esters containing the different radicals in different proportions. Mixtures of esters made in this way are still extremely suitable for use as synthetic lubricants and hydraulic fluids, and there is no need for the product to be a pure chemical compound.

Typical ortho-silicate esters of this invention are those listed below and mixtures of them:

Tetra(1,1-dimethyl-3-thiaheptyl) ortho-silicate
Tetra(1,1-dimethyl-4-thiaoctyl) ortho-silicate
Tetra(1,1-dimethyl-5-thianonyl) ortho-silicate
Tetra(1,1,2-trimethyl-3-thiaheptyl) ortho-silicate
Di(1,1-dimethyl-3-thiaheptyl) di(7-thia-undecyl) ortho-silicate
Mono(1,1,2-trimethyl-3-thiaheptyl) tri(4-thia-octyl) ortho-silicate
Di(1,1-dimethyl-3-thiaheptyl) di(2-ethyl hexyl) ortho-silicate
Di(1,1-dimethyl-4-thiaoctyl) di(3,5,5-trimethyl hexyl) ortho-silicate
Di(1,1-dimethyl-3-thiaheptyl) di-tertiary butyl ortho-silicate
Mono(1,1-dimethyl-3-thiaheptyl) tri(dimethyl isopropyl carbinol) ortho-silicate
Di(3-thiaheptyl) di(tertiary butyl) ortho-silicate The invention is illustrated by the following examples in which the relationship of the parts by weight to the parts by volume is that of the kilogram to the liter.

EXAMPLE I 39.5 parts by weight of sodium cut into small pieces were added piece by piece to 1250 parts by volume of anhydrous methanol with stirring. An atmosphere of dry nitrogen was maintained over the the reaction mixture. When formation of sodium methoxide was complete, 155 parts by weight of n-butyl mercaptan were slowly added to the cooled solution. The mixture was then refluxed for one hour. The resulting solution was cooled in an ice bath, and 185.5 parts by weight of 1-chloro-2-methyl propan-2-ol were slowly added with vigorous stirring. Sodium chloride precipitated. When addition was complete, the mixture was refluxed and stirred for an hour, allowed to cool, poured into 3000 parts by volume of water and the product was extracted with 500 parts by volume of ether. The ethereal solution was washed with water until the washings were neutral and then dried over magnesium sulfate. The solvent was removed by distillation and the residue distilled under water-pump vacuum to give 202.3 parts by weight of 1,1-dimethyl-3-thiaheptanol.

131.8 parts by weight of silicon tetrachloride were slowly added with vigorous stirring to a solution of 380 parts by weight of 1,1-dimethyl-3-thiaheptanol and 260 parts by weight of pyridine in 2000 parts by volume of a sodium-dried petroleum naphtha having a boiling range of 80° to 100° C., said solution being cooled in an ice bath. When addition of the thia-alcohol was completed, 304 parts by weight of 2-ethylhexanol were slowly added with cooling. During the addition of both the alcohols, the reaction temperature was not allowed to exceed 30° C. The mixture was then refluxed and stirred for an hour, allowed to cool and poured into 3200 parts by volume of water. The phases were separated, and the organic phase was washed with water until the washings were neutral. After drying over magnesium sulfate, the organic phase was stripped finally, under high vacuum, to yield 436.3 parts by weight of a water-white faintly turbid oil having $n_D^{20}$ 1.4624 and which analyzed as follows:

Percent

Sulfur _____ 10.3
Silicon _____ 4.6

The product was thus di(2-ethyl hexyl) di(1,1-dimethyl-3-thiaheptyl) ortho-silicate, the theoretical sulfur content of which is 10.5% and the theoretical silicon content of which is 4.6%. The product had a viscosity of 3.09 cs. at 210° F. and of 11.2 cs. at 100° F. Its kinematic viscosity index was 156.

Di(2-ethyl hexyl) di(1,1-dimethyl-3-thiaheptyl) ortho-silicate is a lubricating oil with outstanding load-carrying capacity. Thus when tested in the I.A.E. 3¼ inch centres gear lubricating testing machine in accordance with Method IP 166/58 of the British "Standard Methods for Testing Petroleum and Its Products," this material withstood a load of 170 lbs. at 2000 r.p.m. and 90° C. before scuffing ocurred. Even at 6000 r.p.m. and 140° C., no scuffing occurred at the limit of the machine, i.e. when the gear teeth fractured.

EXAMPLE II 42.5 parts by weight of silicon tetrachloride were slowly added with vigorous stirring to a solution of 55.6 parts by weight of tertiary butyl alcohol and 83 parts by weight of pyridine in 500 parts by volume of sodium-dried petroleum naphtha having a boiling range of 80° to 100° C., said solution being cooled in an ice bath. When addition of tertiary butyl alcohol was completed, 100.7 parts by weight of 3-thiaheptanol were slowly added with cooling. During the addition of both alcohols, the reaction temperature was not allowed to exceed 20° C. The mixture was then refluxed and stirred for an hour, allowed to cool and poured into 1000 parts of water. The phases were separated, and the organic phase was washed with water until the washings were neutral. After drying over magnesium sulfate, the organic phase was stripped, finally under high vacuum, to yield 97.4 parts by weight of a water-white faintly turbid oil having $n_D^{20}$ 1.4590 and which analyzed as follows:

Percent

Sulfur _____ 14.7
Silicon _____ 6.3

The product was thus di(3-thia-heptyl) di(tertiary butyl) ortho-silicate, the theoretical sulfur content of which is 14.6% and the theoretical silicon content of which is 6.4%. The product had a viscosity of 2.08 cs. at 210° F. and of 6.17 cs. at 100° F. Its kinematic viscosity index was 147.

Not only are the ortho-silicate esters of this invention outstanding lubricating oils with excellent load-carrying capacities, but also they are capable of imparting high load-carrying capacities to other lubricating oils. Accordingly, the present invention also provides lubricating compositions comprising a lubricating oil and one or more of the ortho-silicate esters of this invention.

The lubricating oils with which the ortho-silicate esters of this invention may be blended may be mineral lubricating oils or synthetic lubricating oils, such as the dialkyl esters of dicarboxylic acids, e.g. dioctyl and dinonyl sebacates and adipates, polyoxyalkylene liquids, such as polyoxyethylene and polyoxypropylene liquids, liquid polysiloxanes and liquid polymers of unsaturated hydrocarbons.

It is preferred that lubricating oil compositions contain at least 5% by weight of the subject thia-alkyl ortho-silicates and preferably between 10 and 65% by weight thereof. Alternatively, of course, the thia-alkyl ortho-sicilates of the invention may comprise the entire lubricating composition. Particularly useful lubricating compositions comprise 40–60% by weight of an aliphatic ester of a dicarboxylic acid; 20–40% by weight of an ether or ester of hepteric or block polymers of ethylene oxide or ethylene glycol with propylene oxide or propylene glycol and 2.5–25% by weight of the subject thia-esters of this invention. The classes of oxyalkylene compounds include those disclosed in U.S. Patents 2,599,803 and 2,425,845. Preferably, an anti-oxidant is also utilized such as phenothiazine although this is not essential.

The following compositions are examples of lubricating compositions of this invention.

Composition A: Parts by weight
Coester of sebacic acid, 2-ethyl hexanol and
3,5,5-trimethyl hexanol _____ 66
Monobutyl ether of a liquid block copolymer of
ethylene oxide and propylene oxide _____ 33
Phenothiazine _____ 1
Di(2-ethyl hexyl) di(1,1-dimethyl-3-thiaheptyl)
ortho-silicate _____ 5

Composition B:
Coester of sebacic acid, 2-ethyl hexanol and
3,5,5-trimethyl hexanol _____ 66
The monobutyl ether of composition A _____ 33
Phenothiazine _____ 1
Di(2-ethyl hexyl) di(1,1-dimethyl-3-thiaheptyl)
ortho-silicate _____ 10

Composition C:
Di(3,5,5-trimethyl hexyl) sebacate _____ 80
Di(2-ethyl hexyl) di(1,1-dimethyl-3-thiaheptyl)
ortho-silicate _____ 20

Compositions A, B and C above are lubricating compositions with outstanding load-carrying capacities. Thus, when composition B was tested according to IP 166/58 referred to above at 2000 r.p.m. at 104° C., it withstood a load of 120 lbs. before scuffing occurred. If the ortho-silicate is omitted from this composition, the resulting composition when tested in the same way under the same conditions will withstand a load of only 75 lbs. before scuffing occurs.

In order to illustrate the outstanding hydrolytic stability of the ortho-silicate esters of the present invention, composition C above was compared with composition X below in the MIL-F-9042 (United States Air Force) Specification Hydrolytic Stability Test. Composition X contains a tetra-thia-alkyl ortho-silicate outside the scope of the present invention because it contains no tertiary carbon atom attached to an oxygen atom.

Composition X: Parts by weight
Di(3,5,5-trimethyl hexyl)sebacate _____ 80
Tetra(7-thia-undecyl)ortho-silicate _____ 20

The MIL-F-9042 test, known colloquially as the "pop-bottle test," forms part of a specification for high temperature hydraulic fluids for aircraft. It consists in agitating a 75 gram sample of the fluid under test with 25 grams distilled water in a 7 oz. "carbonated beverage bottle," for 48 hours, the bottle being rotated, end-over-end at 5 r.p.m. in an oven maintained at 93±0.2° C. (200±0.4° F.). A copper test strip, 1.3 cm. x 5.1 cm., of 16 to 22 B. and S. gauge, is included in the bottle. At the end of the test, the contents of the bottle are centrifuged for 15 minutes at not less than 1500 r.p.m. The aqueous layer is then separated, and the fluid layer washed with water till the washings are neutral to litmus. The neutralization value of the combined aqueous layer and washings, the neutralization value and viscosity of the fluid layer and the weight of an insoluble matter are determined. The copper test strip is washed, weighed and inspected.

To pass the test, the following conditions must be satisfied:

(1) The loss in weight of the copper strip shall not exceed 0.5 mg./sq. cm. There shall be no visible corrosion. Slight discoloration of the surface is allowed.

(2) The fluid shall not change more than —5% to +15% in viscosity, measured in cs. at 130° F., and the acid number increase shall not exceed 0.5 mg. KOH/g.

(3) The total acidity of the combined water layers shall not exceed the equivalent of 10 mg. KOH.

(4) The amount of insoluble matter shall not exceed 0.5% w.

The results of the test as applied to compositions C and X are set out in Table I below:

Table I

| Specification Requirement | Composition C | Composition X |
|---|---|---|
| Weight change of copper strip, mg./sq. cm. | −0.1 | |
| Insoluble matter, percent w | nil | 1.1 |
| Acidity of aqueous layers, mg./KOH per gram | 6.7 | 1.7 |
| Acid number of oil after test, mg./KOH per gram | 0.1 | 0.14 |
| Percentage change in viscosity measured in cs. at 130° F. | 0 | |

The solid matter formed when composition X was subjected to the above test was wholly silica and was equivalent to 68% of the amount of silica present in the composition. It can thus be seen that, whereas in composition X over one-half of the ortho-silicate ester was hydrolyzed, in composition C none of it was hydrolyzed and the whole composition meets the specification.

While the ortho-silicate esters of the present invention are outstanding lubricating oils and blending components for lubricating compositions, they may on occasion require the addition of additives in amounts of 0.25–2.5% by weight in order that they may meet some particularly stringent specification requirements. Thus their oxidation and thermal stability may be improved, if necessary, by the addition of a minor proportion of an epoxy compound and of a metal salt of a condensation product of an aldehyde with a phenol or thiophenol. Their oxidation and corrosion characteristics may be improved by the addition of an epoxy compound and an arylamine containing a plurality of amino-aryl linkages, or by the addition of a bis(amino-arylalkane) and of a thio-di-arylamine. The thio-di-arylamines, in particular phenothiazine and its substitution products, are particularly useful additives either on their own or with the said bis(amino-arylalkanes).

As already mentioned, the ortho-silicate esters of the present invention are excellent hydraulic fluids, and therefore the present invention also provides a system for the transmission of power in which there is employed as hydraulic fluid an ortho-silicate ester of this invention. Typical systems for the transmission of power to which the present esters may be applied are braking systems, shock absorber systems, hydraulic lifting jacks and injection moulding machines.

A further aspect of this invention comprises novel disiloxanes having the general formula

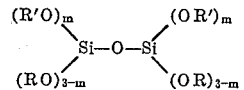

in which $m$ is a whole number from 1 to 3, R' is a thia-alkyl group and R is an alkyl group, and in which at least one of the carbon atoms attached to an oxygen atom is a tertiary carbon atom. It will be seen that these disiloxanes correspond closely to the structures previously described relative to the ortho-silicates in that they require the presence of at least two thia-alkyl radicals and the presence of at least one tertiary carbon atom directly attached to an oxygen atom. The principal purpose for providing disiloxanes of this configuration, beyond the advantages already pointed out relative to the corresponding ortho-silicates, is that of higher viscosity. Moreover, more flexibility is provided for the preparation of mixed esters and of mixtures of esters as well as mixtures of thia-silicates and thia-disiloxanes. The tertiary carbon atoms may be present in radicals all attached to a single silicon atom or divided between the two silicon atoms. It is preferred that at least 3 of the ester groups be thia-alkyl and that at least 3 of the carbon atoms directly attached to oxygen be teritary carbon atoms. Typical species falling within the class of disiloxanes comprising part of this invention are as follows:

1,1,1 - tri(1,1 - dimethyl - 3 - thiaheptoxy) - 3,3,3 - tri(tert-butoxy)disiloxane 1,3 - dimethoxy - 1,1,3,3 - tetra(1,1 - dimethyl - 4 - thiaoctoxy)disiloxane 1,3 - di(2 - ethylhexoxy) - 1,1,3,3 - tetra(1,1,2-trimethyl-3-thiaheptoxy)disiloxane 1,1,3,3 - tetra(3 - thiaheptoxy) - 1,3 - di(tertiary butoxy)-disiloxane Preferably, each of the thia-alkyl and alkyl radicals in the disiloxane contains 4–10 carbon atoms each. The disiloxane may be synthesized by coupling the appropriate alkoxy or thia-alkoxy monochloro silane with water in the presence of an acid acceptor, such as alpha picoline. When the alkyl or thia-alkyl groups are secondary, the theoretical amount of water should not be exceeded to reduce silanol formation. Disiloxanes having a total of 2 tertiary alkoxy or tertiary thia-alkoxy groups may be synthesized by coupling the appropriate mixed alkoxy or thia-alkoxy chloro silane with the theoretical amount of water. Disiloxanes having 4 or more tertiary alkoxy or thia-alkoxy groups may be synthesized by coupling the trialkoxy (or trithia-alkoxy) chloro silane with the sodium salt of the corresponding silanol.

We claim as our invention:

1. Silicone-containing compounds selected from the group consisting of ortho-silicate esters of the general formula $$[RO]_{4-n} Si[OR']_n$$

in which $n$ is a whole number from 1 to 4, R' is a thia-alkyl group and R is an alkyl group and in which at least one of the carbon atoms attached to an oxygen atom is a tertiary carbon atom and a disiloxane of the general formula

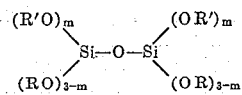

in which $m$ is a whole number from 1 to 3, R' is a thia-alkyl group, R is an alkyl group, and in which at least one of the carbon atoms attached to an oxygen atom is a tertiary carbon atom.

2. Ortho-silicate esters according to claim 1 in which each of the thia-alkyl and alkyl groups in the ester contains 6 to 10 carbon atoms.

3. Tetra(1,1-dimethyl-3-thiaheptyl)ortho-silicate.

4. Di(3-thiaheptyl)di(tertiary butyl)ortho-silicate.

5. Di(1,1 - dimethyl - 3 - thiaheptyl)di(7 - thia - undecyl)ortho-silicate.

6. Di(1,1 - dimethyl - 3 - thiaheptyl)di(2 - ethyl hexyl)-ortho-silicate.

7. 1,1,3,3 - tetra(3 - thiaheptoxy) - 1,3 - di(tertiary butoxy)disiloxane.

References Cited in the file of this patent

UNITED STATES PATENTS

| | | |
|---|---|---|
| 2,160,881 | Loane et al. | June 6, 1939 |
| 2,609,343 | Saunders et al. | Sept. 2, 1952 |
| 2,719,860 | Morris et al. | Oct. 4, 1955 |
| 2,752,381 | Peppel et al. | June 26, 1956 |